United States Patent
Morinaga et al.

(10) Patent No.: US 11,061,289 B2
(45) Date of Patent: Jul. 13, 2021

(54) LIQUID CRYSTAL DISPLAY DEVICE

(71) Applicant: SHARP KABUSHIKI KAISHA, Osaka (JP)

(72) Inventors: Junichi Morinaga, Osaka (JP); Shingo Kamitani, Osaka (JP); Katsuya Ogawa, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/854,414

(22) Filed: Apr. 21, 2020

(65) Prior Publication Data
US 2020/0341319 A1    Oct. 29, 2020

(30) Foreign Application Priority Data
Apr. 23, 2019    (JP) ............... JP2019-081898

(51) Int. Cl.
*G02F 1/1339* (2006.01)
*G02F 1/1362* (2006.01)
*G02F 1/1337* (2006.01)

(52) U.S. Cl.
CPC ........ *G02F 1/13394* (2013.01); *G02F 1/1337* (2013.01); *G02F 1/136286* (2013.01); *G02F 1/13396* (2021.01)

(58) Field of Classification Search
CPC ............... G02F 1/13394; G02F 1/1337; G02F 1/136286; G02F 2001/13396
See application file for complete search history.

(56) References Cited

U.S. PATENT DOCUMENTS

| | | | |
|---|---|---|---|
| 2001/0026347 A1* | 10/2001 | Sawasaki | ............ G02F 1/13394 349/156 |
| 2005/0140914 A1 | 6/2005 | Sawasaki et al. | |
| 2008/0182351 A1 | 7/2008 | Sawasaki et al. | |

FOREIGN PATENT DOCUMENTS

JP    2005-189662 A    7/2005

* cited by examiner

*Primary Examiner* — Dung T Nguyen
(74) *Attorney, Agent, or Firm* — ScienBiziP, P.C.

(57) ABSTRACT

A liquid crystal display device includes a first substrate, a second substrate, and a liquid crystal layer supported between the first substrate and the second substrate, wherein the first substrate includes a main spacer and a sub-spacer protruding toward the liquid crystal layer, a height of the main spacer is greater than a height of the sub-spacer, the second substrate includes, on a surface facing the liquid crystal layer, an alignment film, a main pedestal portion that comes into contact with the main spacer, and a sub-pedestal portion opposite the sub-spacer, an area of a top portion of the main pedestal portion is greater than an area of a top portion of the main spacer, and an area of a top portion of the sub-pedestal portion is less than an area of a top portion of the sub-spacer.

6 Claims, 14 Drawing Sheets

LIQUID CRYSTAL DISPLAY DEVICE

CROSS-REFERENCE TO RELATED APPLICATIONS

This application claims the benefit of priority to Japanese Patent Application Number 2019-081898 filed on Apr. 23, 2019. The entire contents of the above-identified application are hereby incorporated by reference.

BACKGROUND

Technical Field

The disclosure relates to liquid crystal display devices.

A liquid crystal display device is a display device in which a liquid crystal composition is used to perform display. In a typical display system for the liquid crystal display device, a liquid crystal panel including the liquid crystal composition enclosed between a pair of substrates is irradiated with light from a backlight, and voltage is applied to the liquid crystal composition to change the alignment of liquid crystal molecules, thereby controlling an amount of light passing through the liquid crystal panel. Such a liquid crystal display device has features such as a thin profile, light weight, and low power consumption, and is therefore utilized in electronic devices such as a television, a smartphone, a tablet terminal, and an automotive navigation system.

The liquid crystal panel has a configuration in which the liquid crystal layer is sealed between a pair of substrates, and the distance between the pair of substrates (cell thickness) is determined by a spacer. As a spacer, not only a main spacer for controlling the cell thickness, but also a sub-spacer that is lower than the main spacer may be provided in order to ensure strength for when the liquid crystal panel is put under pressure. Furthermore, a pedestal portion may be disposed in the substrate facing the spacer to ensure strength. For example, JP 2005-189662 A describes a configuration of a liquid crystal display device including structures (main spacer and sub-spacer) having different heights formed on an opposite substrate (color filter substrate) and a structure (pedestal portion) that supports a spacer formed on a TFT substrate (see Example 4 and FIGS. 3, 19, and 20). In this configuration, a structure is provided on the TFT substrate side and the color filter substrate side, and the height of the structure (main spacer) defining the cell thickness is determined by the total height of the structures on the TFT substrate side and the color filter substrate side. Additionally, the height of the structure (sub-spacer) configured to support the panel when an external load is applied to the liquid crystal panel is set to be from approximately 0.3 to 1.0 μm less than the total height of the structure defining the cell thickness on the TFT substrate side and the color filter substrate side.

SUMMARY

FIG. 12 is a schematic plan view illustrating an arrangement relationship between a sub-spacer and a pedestal portion in a known liquid crystal panel. FIG. 13 is a schematic cross-sectional view illustrating an arrangement relationship between a sub-spacer and a pedestal portion in a known liquid crystal panel. As illustrated in FIGS. 12 and 13, in a known liquid crystal panel, the area of the pedestal portion is typically larger than the area of the spacer so that the spacer and the pedestal portion face each other even when misalignment occurs during substrate bonding.

Also, when a large number of sub-spacers are disposed to ensure strength, the spacing between adjacent pedestal portions is decreased. Thus, problems such as coating unevenness of alignment film material or the like may occur in the substrate on which the pedestal portion is disposed. In particular, in each pixel, when a contact hole for connecting a pixel electrode and a TFT drain electrode is disposed between adjacent pedestal portions, a large groove-like step is formed in the substrate on which the pedestal portion is disposed, making it difficult to form the alignment film uniformly.

The disclosure has been made in view of the above-described circumstances, and an object thereof is to provide a liquid crystal display device capable of suppressing the occurrence of display failure due to the coating unevenness of alignment film material.

(1) A liquid crystal display device according to an embodiment of the disclosure includes: a first substrate; a second substrate; and a liquid crystal layer supported between the first substrate and the second substrate, wherein the first substrate includes a main spacer and a sub-spacer protruding toward the liquid crystal layer, a height of the main spacer is greater than a height of the sub-spacer, the second substrate includes, on a surface facing the liquid crystal layer, an alignment film, a main pedestal portion that comes into contact with the main spacer, and a sub-pedestal portion opposite the sub-spacer, an area of a top portion of the main pedestal portion is greater than an area of a top portion of the main spacer, and an area of a top portion of the sub-pedestal portion is less than an area of a top portion of the sub-spacer.

(2) A liquid crystal display device according to an embodiment of the disclosure has the configuration of (1), wherein an area of a base of the sub-pedestal portion is less than an area of a base of the main pedestal portion.

(3) A liquid crystal display device according to an embodiment of the disclosure has the configuration of (1) or (2), wherein arrangement density of the sub-pedestal portion is higher than arrangement density of the main pedestal portion.

(4) A liquid crystal display device according to an embodiment of the disclosure has the configuration of (1), (2), or (3),
wherein the second substrate is an active matrix substrate including a contact hole, the sub-pedestal portion includes a first sub-pedestal portion and a second sub-pedestal portion disposed at a corner portion adjacent to a corner portion where the first sub-pedestal portion is disposed, and
the contact hole is disposed between the first sub-pedestal portion and the second sub-pedestal portion.

(5) A liquid crystal display device according to an embodiment of the disclosure has the configuration of (1), (2), (3), or (4), wherein the second substrate is an active matrix substrate including a plurality of signal lines disposed intersecting one another in a substrate plane, and
the main pedestal portion and the sub-pedestal portion are disposed at a portion where the plurality of signal lines intersect.

(6) A liquid crystal display device according to an embodiment of the disclosure has the configuration of (1), (2), (3), (4), or (5), wherein the sub-spacer and the sub-pedestal portion are not disposed at at least one corner portion of corner portions adjacent to a corner portion where the main spacer and the main pedestal portion are disposed.

(7) A liquid crystal display device according to an embodiment of the disclosure has the configuration of (1), (2), (3), (4), or (5), wherein the sub-pedestal portion includes a third sub-pedestal portion disposed at at least one corner portion of corner portions adjacent to a corner portion where the main spacer and the main pedestal portion are disposed and a fourth sub-pedestal portion disposed at another corner portion, and an area of a top portion of the third sub-pedestal portion is less than an area of a top portion of the fourth sub-pedestal portion.

According to the disclosure, a liquid crystal display device capable of suppressing the occurrence of display failure due to the coating unevenness of alignment film material can be provided.

BRIEF DESCRIPTION OF DRAWINGS

The disclosure will be described with reference to the accompanying drawings, wherein like numbers reference like elements.

DESCRIPTION OF EMBODIMENTS

Figure 1:
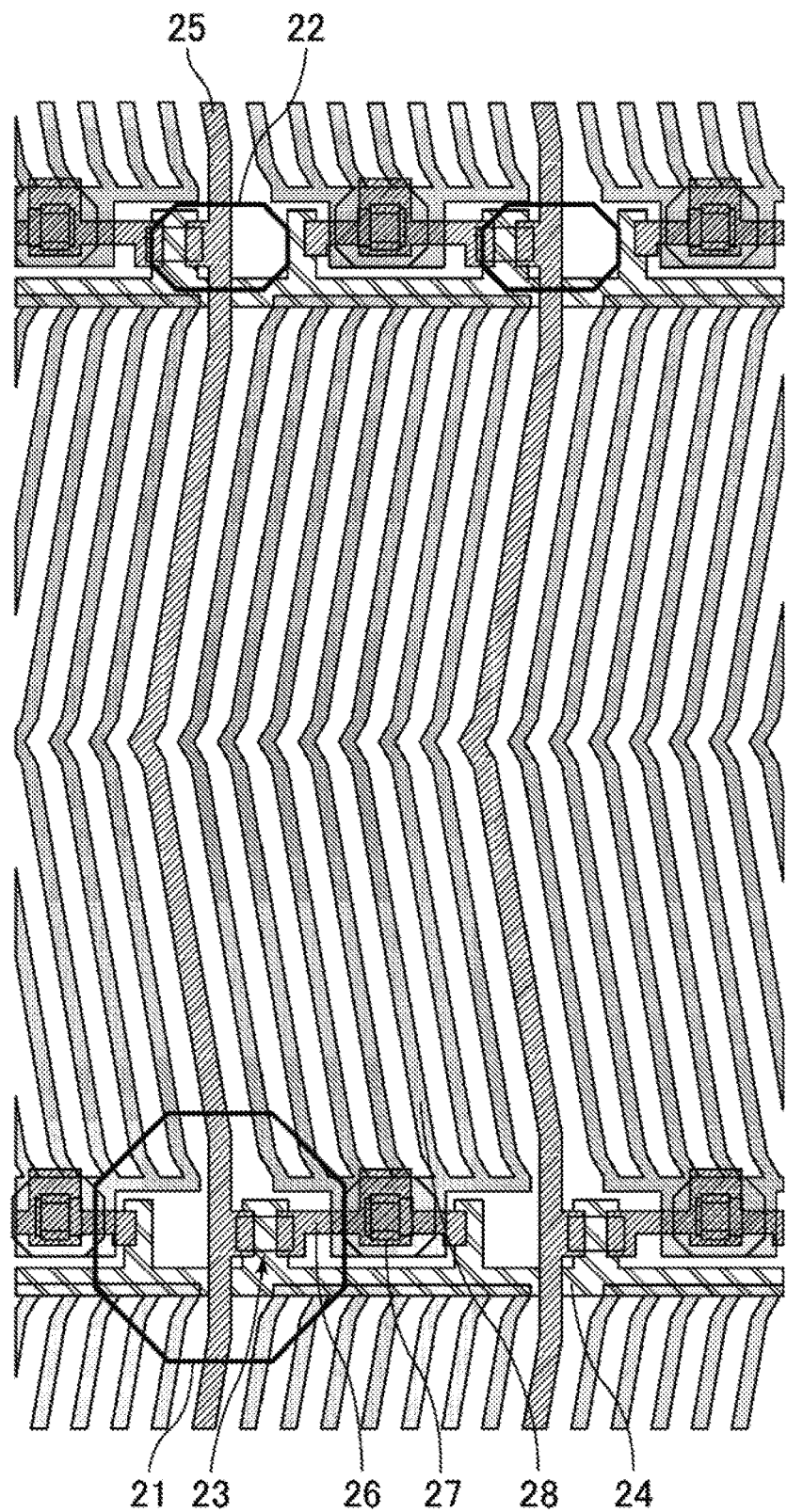
FIG. 1 is a schematic plan view illustrating the configuration of a pixel in a TFT substrate of a liquid crystal display device of Example 1.

A liquid crystal display device according to an embodiment of the disclosure will be described hereinafter. The disclosure is not limited to the contents described in the following embodiments, and appropriate design changes can be made within a scope that satisfies the configuration of the disclosure.

A liquid crystal display device according to an embodiment of the disclosure comprises: a first substrate; a second substrate; and a liquid crystal layer supported between the first substrate and the second substrate, wherein the first substrate includes a main spacer and a sub-spacer protruding toward the liquid crystal layer, a height of the main spacer is greater than a height of the sub-spacer, the second substrate includes, on a surface facing the liquid crystal layer, an alignment film, a main pedestal portion that comes into contact with the main spacer, and a sub-pedestal portion opposite the sub-spacer, an area of a top portion of the main pedestal portion is greater than an area of a top portion of the main spacer, and an area of a top portion of the sub-pedestal portion is less than an area of a top portion of the sub-spacer.

The first substrate and the second substrate are not particularly limited and are only required to be a pair of substrates sandwiching the liquid crystal layer. Examples include: a combination of the first substrate being a TFT substrate and the second substrate being a color filter substrate; and a combination of the first substrate being a color filter substrate and the second substrate being a TFT substrate.

The main spacer is provided to control the distance (cell thickness) between the pair of substrates. In a normal state in which the liquid crystal panel is not under pressure, a top portion of the main spacer provided on the first substrate comes into contact with a top portion of the main pedestal portion provided on the second substrate.

The sub-spacer is provided to ensure sufficient strength when the liquid crystal panel is under pressure. In a normal state in which the liquid crystal panel is not under pressure, a top portion of the sub-spacer provided on the first substrate does not come into contact with a top portion of the sub-pedestal portion provided on the second substrate. However, when the liquid crystal panel is under pressure, the top portion of the sub-spacer comes into contact with the top portion of the sub-pedestal portion. By providing the sub-spacer in such a manner, an excessive deformation of the liquid crystal panel can be prevented.

The main spacer and the sub-spacer are preferably cured products made of photosensitive resin (photo spacers). Forming the main spacer and the sub-spacer with photosensitive resin allows for the shape of the main spacer and the sub-spacer to be patterned by photolithography.

Herein, "the height of the main spacer is greater than the height of the sub-spacer" means that the top portion of the main spacer is located closer to the second substrate (liquid crystal side) than the top portion of the sub-spacer. The main spacer may, for example, be formed by layering another layer on the top portion of the sub-spacer.

The main pedestal portion is preferably a portion that comes into contact with the main spacer provided on the first substrate. The main pedestal portion preferably protrudes toward the liquid crystal layer further than the flattening film which is the underlayer of the alignment film. For example, the main pedestal portion is preferably a layer provided on the liquid crystal layer side of the flattening film provided on the second substrate. Additionally, the top portion of the main pedestal portion is preferably planar.

The area of the top portion (liquid crystal side tip) of the main pedestal portion is greater than the area of the top portion (liquid crystal side tip) of the main spacer. Herein, "the area of the top portion of the main pedestal portion", when the top portion is planar, means the area of the entire surface on the side that comes into contact with the top portion of the main spacer. When the top portion is not planar, it means the area of a cross-section at a height of 90% of the total height of the main pedestal portion. "The area of the top portion of the main spacer", when the top portion is planar, means the area of the portion that comes into contact with the main pedestal portion. When the top portion is not planar, it means the area of a cross-section at a height of 90% of the total height of the main spacer. The area of the top portion of the main pedestal portion is preferably set so that the main pedestal portion comes into contact with the top portion of the main spacer even when the first substrate and the second substrate are bonded together within an expected amount of misalignment.

The sub-pedestal portion is preferably a portion that faces the sub-spacer provided on the first substrate. The sub-pedestal portion preferably protrudes toward the liquid crystal layer further than the flattening film which is the underlayer of the alignment film. For example, the sub-pedestal portion is preferably a layer provided on the liquid crystal layer side of the flattening film provided on the second substrate. Additionally, the top portion of the sub-pedestal portion is preferably planar.

The area of the top portion (liquid crystal side tip) of the sub-pedestal portion is less than the area of the top portion (liquid crystal side tip) of the sub-spacer. Herein, "the area of the top portion of the sub-pedestal portion", when the top portion is planar, means the area of the entire surface on the side that faces the top portion of the sub-spacer. When the top portion is not planar, it means the area of a cross-section at a height of 90% of the total height of the sub-pedestal portion. "The area of the top portion of the sub-spacer", when the top portion is planar, means the area of the portion that faces the sub-pedestal portion. When the top portion is not planar, it means the area of a cross-section at a height of 90% of the total height of the sub-spacer. The area of the top portion of the sub-pedestal portion is preferably set so that the distance between the sub-pedestal portion and the main pedestal portion; the distance between the sub-pedestal portion and an adjacent sub-pedestal portion; and the distance between the sub-pedestal portion and a recessed portion such as a contact hole provided on the second substrate are kept at or above a certain level.

The main pedestal portion and the sub-pedestal portion are preferably provided in a light blocking region, for example, overlapping a signal line provided on the second substrate, a black matrix provided on the first substrate, and the like.

The main pedestal portion and the sub-pedestal portion are preferably cured products made of photosensitive resin. Forming the main pedestal portion and the sub-pedestal portion with photosensitive resin allows for the shape of the main pedestal portion and the sub-pedestal portion to be patterned by photolithography.

In the liquid crystal display device according to the embodiment described above, the main pedestal portion that comes into contact with the main spacer that determines cell thickness is designed to ensure a positional misalignment margin equal to or greater than the bonding misalignment larger than the spacer size. On the other hand, by reducing the sub-pedestal portion to a size smaller than the sub-spacer, the pedestal region can be reduced in size. Also, when a recessed portion such as a contact hole is provided, the flat region can be increased in size. In this manner, the applicability of the alignment film material is increased, allowing the alignment film to be formed uniformly in the panel plane.

Preferable modes of the liquid crystal display device according to the embodiment described above will be described below.

Preferably, an area of a base (substrate side end portion) of the sub-pedestal portion is less than an area of a base (substrate side end portion) of the main pedestal portion. Preferably, the arrangement density of the sub-pedestal portion is higher than the arrangement density of the main pedestal portion. In the liquid crystal display device including the main spacer and the sub-spacer, when the pedestal portion is disposed on the substrate associated with the spacer, from the perspective of increasing the applicability of the alignment film material on the substrate associated with the spacer, it is advantageous to set the size and the area of the pedestal portion associated with the spacer, of which there are many, to be smaller than the size and the area of the pedestal portion associated with the main spacer, of which there are few.

Preferably, the second substrate is an active matrix substrate including a contact hole, the sub-pedestal portion includes a first sub-pedestal portion and a second sub-pedestal portion disposed at a corner portion adjacent to a corner portion where the first sub-pedestal portion is disposed, and the contact hole is disposed between the first sub-pedestal portion and the second sub-pedestal portion. In a configuration in which contact holes are disposed between the sub-pedestal portions, by decreasing the area of the sub-pedestal portions, the applicability of the alignment film material can be significantly increased.

Preferably, the second substrate is an active matrix substrate including a plurality of signal lines disposed intersecting one another in a substrate plane, and the main pedestal portion and the sub-pedestal portion are disposed at a portion where the plurality of signal lines intersect. This can prevent a decrease in the aperture ratio due to the main pedestal portion and the sub-pedestal portion.

Preferably, the sub-spacer and the sub-pedestal portion are not disposed at at least one corner portion of corner portions adjacent to a corner portion where the main spacer and the main pedestal portion are disposed. In this configuration, the area with no pedestal portions is increased and the applicability of the alignment film material is increased. This allows the alignment film to be formed uniformly in the panel plane.

Preferably, the sub-pedestal portion includes a third sub-pedestal portion disposed at at least one corner portion of corner portions adjacent to a corner portion where the main spacer and the main pedestal portion are disposed and a fourth sub-pedestal portion disposed at another corner portion, and an area of a top portion of the third sub-pedestal portion is less than an area of a top portion of the fourth sub-pedestal portion. With a configuration of this design, the area with no pedestal portions is increased, the applicability of the alignment film material is increased, and load-resistant properties can be kept high.

The disclosure will be described in detail below using examples; the disclosure; however, is not limited only to these examples.

Example 1

Figure 2:
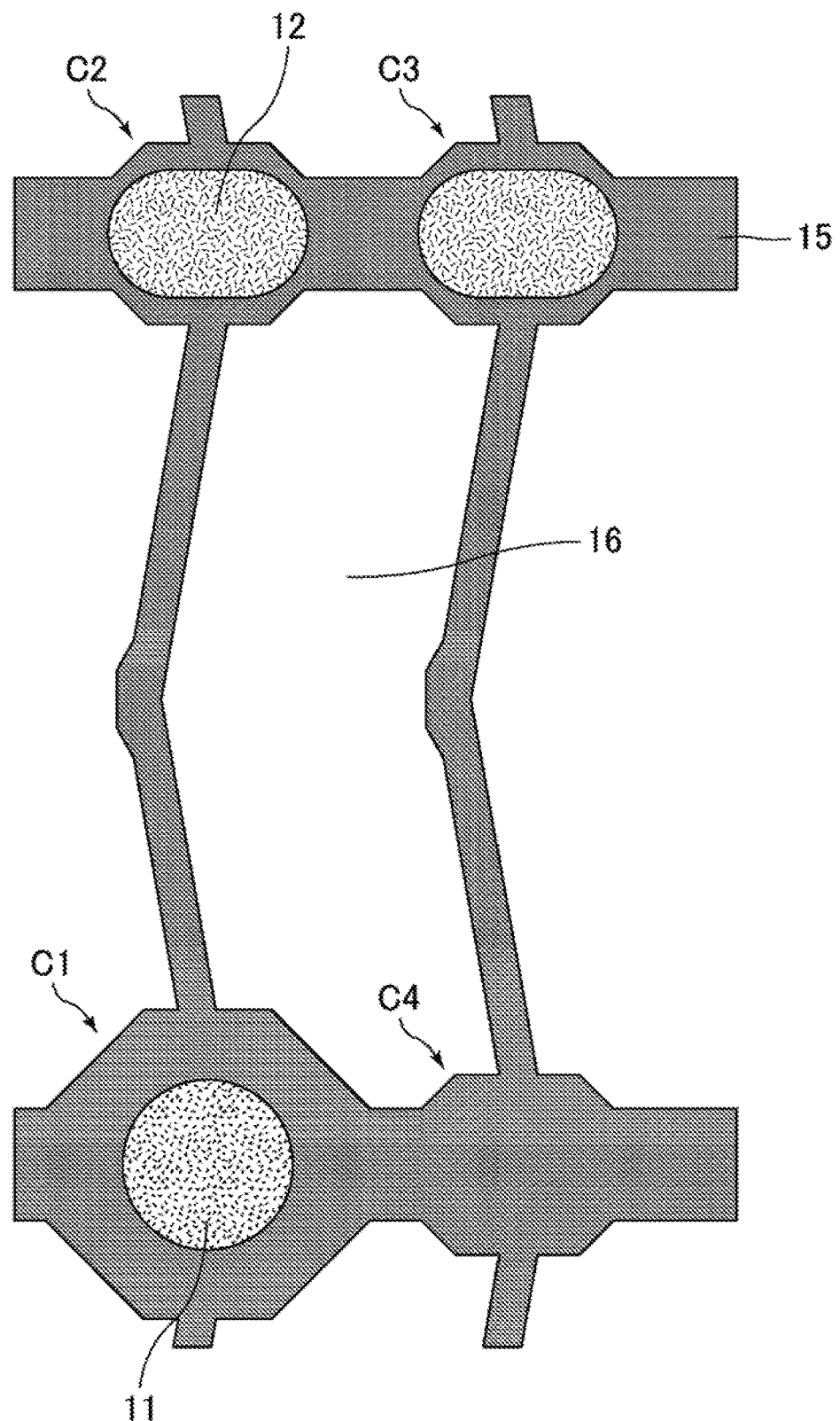
FIG. 2 is a schematic plan view illustrating the configuration of a pixel in a color filter substrate of the liquid crystal display device of Example 1.
Figure 3:
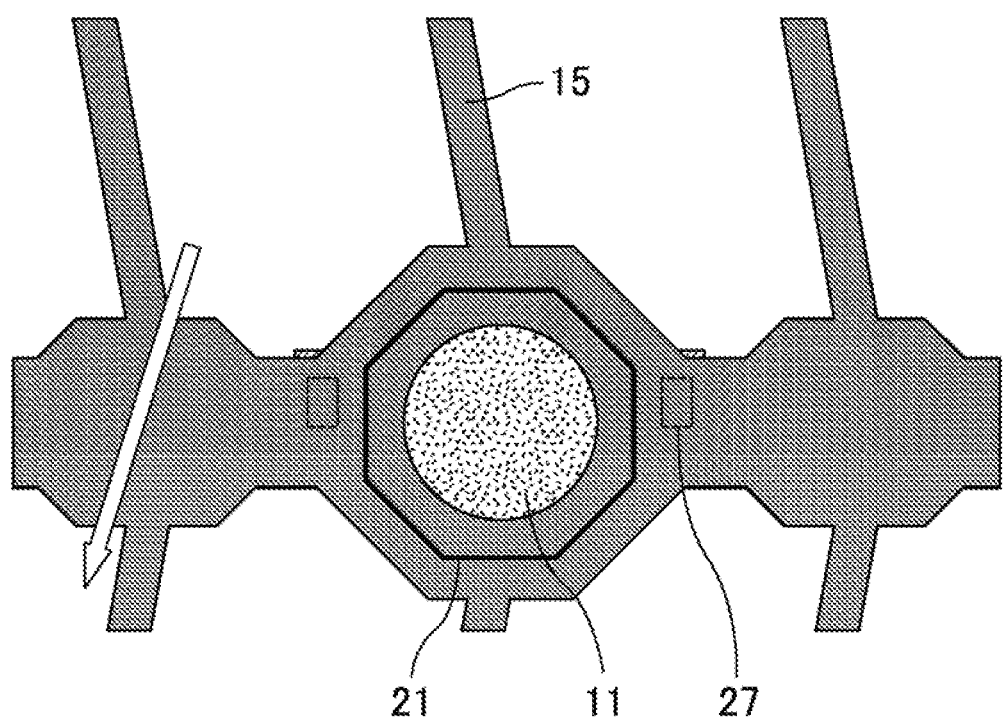
FIG. 3 is an enlarged schematic plan view illustrating a region including a main spacer and a main pedestal portion in Example 1.
Figure 4:
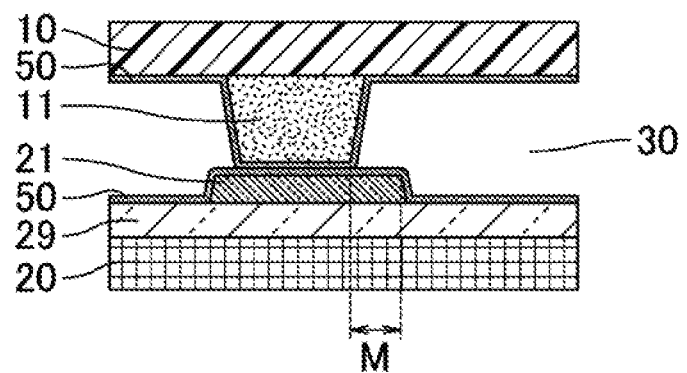
FIG. 4 is an enlarged schematic cross-sectional view illustrating a region including the main spacer and the main pedestal portion in Example 1.
Figure 5:
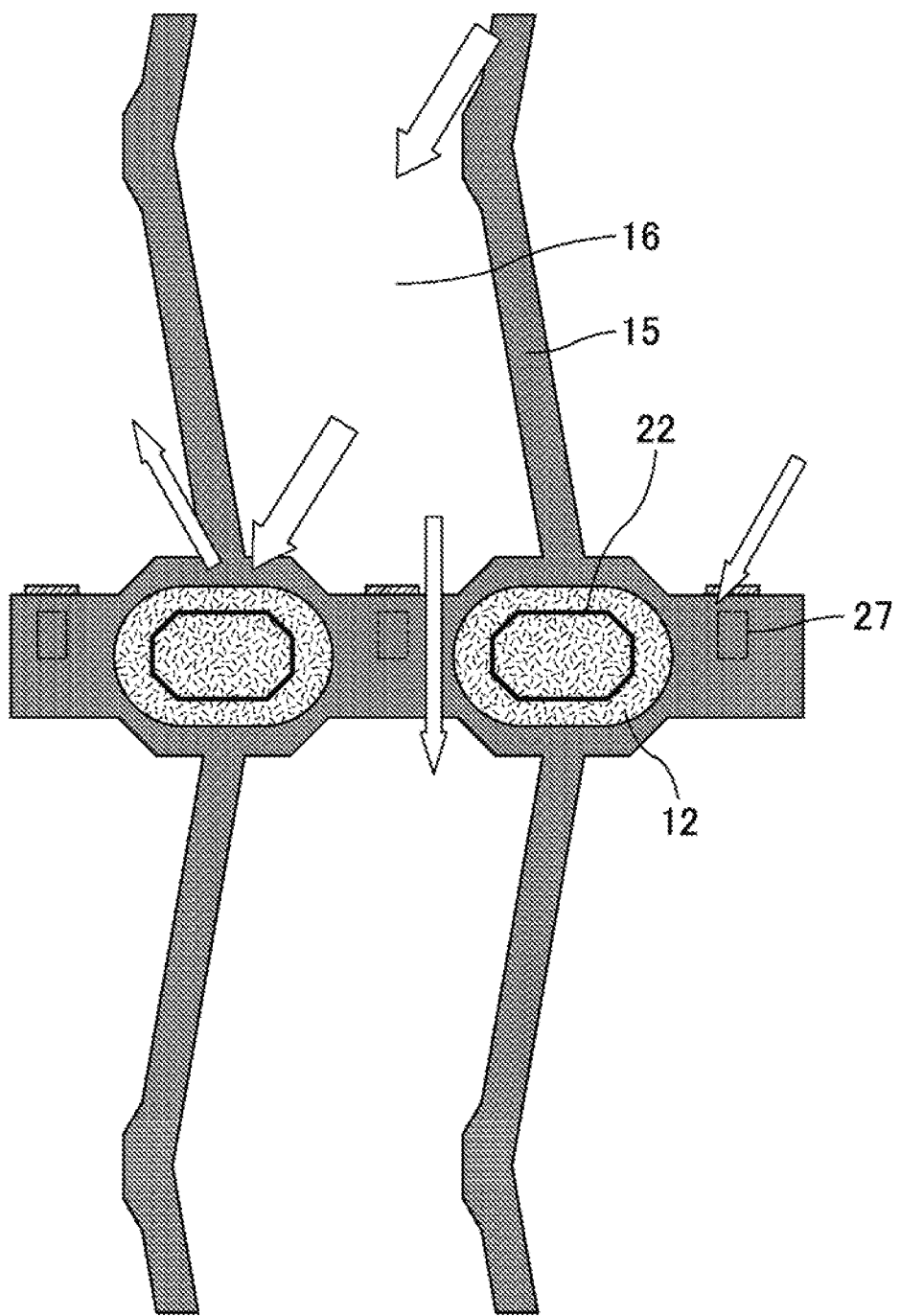
FIG. 5 is an enlarged schematic plan view illustrating a region including a sub-spacer and a sub-pedestal portion in Example 1.
Figure 6:
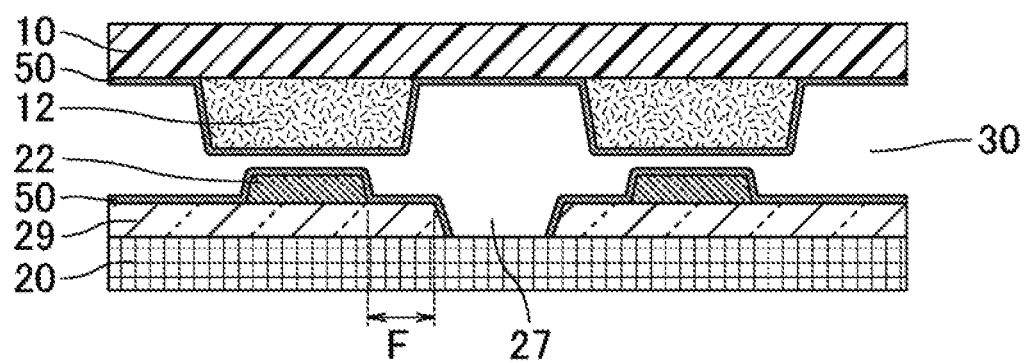
FIG. 6 is an enlarged schematic cross-sectional view illustrating a region including the sub-spacer and the sub-pedestal portion in Example 1.

FIG. 1 is a schematic plan view illustrating the configuration of a pixel in a TFT substrate of a liquid crystal display device of Example 1. FIG. 2 is a schematic plan view illustrating the configuration of a pixel in a color filter substrate of the liquid crystal display device of Example 1. FIG. 3 is an enlarged schematic plan view illustrating a region including a main spacer and a main pedestal portion in Example 1. FIG. 4 is an enlarged schematic cross-sectional view illustrating a region including the main spacer and the main pedestal portion in Example 1. FIG. 5 is an enlarged schematic plan view illustrating a region including a sub-spacer and a sub-pedestal portion in Example 1. FIG. 6 is an enlarged schematic cross-sectional view illustrating a region including the sub-spacer and the sub-pedestal portion in Example 1. The liquid crystal display device according to Example 1 will now be described with reference of FIGS. 1 to 6.

The liquid crystal display device of Example 1 employs a Fringe Field Switching (FFS) liquid crystal mode. A TFT substrate 20 includes a thin film transistor (TFT) 23 at a corner portion of the pixel where a gate signal line 24 and a source signal line 25 intersect. A pixel electrode 28 including a plurality of comb teeth portions is electrically connected to a drain electrode 26 of the TFT 23 via a contact hole 27. The contact hole 27 is a conductive portion that passes through a flattening film 29 that separates a lower layer conductive portion of the drain electrode 26, for example, from the pixel electrode 28. The flattening film 29 is formed of an insulating resin, and the surface on a liquid crystal layer 30 side is flat. A main pedestal portion 21 and a sub-pedestal portion 22 are provided on the flattening film 29 (liquid crystal layer side) at the corner portions of the pixel.

A color filter substrate 10 includes a black matrix (BM) 15 in a region opposite the TFT 23, the gate signal line 24, and the source signal line 25 of the TFT substrate 20. Within the region defined by the BM 15 (within the pixel), a color filter 16 is disposed. The color of the color filter 16 differs from pixel to pixel, and a combination of colors such as red (R), green (G), and blue (B) are provided. In the corner portions of the pixel, a main spacer 11 and a sub-spacer 12 are provided.

As illustrated in FIG. 2, of the four corner portions of the substantially rectangular pixel, the main spacer 11 and the main pedestal portion 21 are provided in a first corner portion C1. A second corner portion C2 adjacent to the first corner portion C1 along the rectangular long side is provided with the sub-spacer 12 and the sub-pedestal portion 22. Also, a third corner portion C3 adjacent to the second corner portion C2 along the rectangular short side is provided with the sub-spacer 12 and the sub-pedestal portion 22. A fourth corner portion C4 adjacent to the first corner portion C1 along the rectangular short side is provided no spacers or pedestal portions.

In the present example, the main spacer 11 is formed on the color filter substrate 10 side to define the cell thickness, the main pedestal portion 21 is formed on the opposite TFT substrate 20 side, and the cell thickness is determined by both. Because the top portion of the main spacer 11 is in contact with the TFT substrate 20, when vibration or an external load is applied, it may scrape against the TFT substrate 20 and damage an alignment film 50. Thus, in order to prevent light leakage due to damage to the alignment film 50, a light blocking range provided by the BM 15 around the main spacer 11 is preferably large. On the other hand, in order to minimize a reduction in transmittance due to the BM 15, the main spacer 11 is preferably sparsely arranged and not disposed in all of the pixels.

When the main spacer 11 is reduced, the main spacer 11 may collapse when an external load is applied, causing cell thickness failure. Thus, the sub-spacer 12 having a slightly lower height than the main spacer 11 is disposed so as to be supported when an external load is applied. The sub-spacer 12 is provided on the color filter substrate 10 side and is not in contact with the TFT substrate 20 side at normal times. From the perspective of increasing the strength of the liquid crystal panel, as many as possible of the sub-spacers 12 are preferably disposed.

The main pedestal portion 21 associated with the main spacer 11 is preferably designed to be larger than the main spacer 11 by the amount of misalignment that may potentially occur in the bonding step. This is to prevent the main pedestal portion 21 from not coming into contact with the main spacer 11 due to the misalignment within design when color filter substrate 10 and the TFT substrate 20 are bonded together. Thus, as illustrated in FIG. 4, a portion (margin portion) M that does not contact the main spacer 11 is provided on the main pedestal portion 21. In addition, when the area of the main spacer 11 is greater than the area of the main pedestal portion 21, it is necessary to ensure a larger light shielding area provided by the BM 15 to compensate. Thus, the aperture ratio is decreased. In the present example, the minimum number of main spacers 11, which are preferably associated with a large pedestal, are provided, and thus the number of main pedestal portions 21 is reduced.

The dimensions of each portion in Example 1 are as follows.

Liquid crystal cell thickness: 3.0 μm

Main spacer 11 height: 1.8 μm

Top portion (liquid crystal side) of main spacer 11 dimensions: circular, diameter 24 μmφ, area 455.0 μm$^2$ Base (substrate side) of main spacer 11 dimensions: circular, diameter 32 μmφ, area 808.9 μm$^2$ Sub-spacer 12 height: 1.3 μm Top portion (liquid crystal side) of sub-spacer 12 dimensions: elliptical, minor diameter 18 μm, major diameter 27 μm, area 417.9 μm$^2$ Base (substrate side) of sub-spacer 12 dimensions: elliptical, minor diameter 22 μm, major diameter 31 μm, area 580.3 μm$^2$ Main pedestal portion 21 and sub-pedestal portion 22 height: 1.2 μm Top portion (liquid crystal side) of main pedestal portion 21 dimensions: octagonal, diameter 39 μmφ, area 1261.7 μm$^2$ Base (substrate side) of main pedestal portion 21 dimensions: octagonal, diameter 44 μmφ, area 1605.8 μm$^2$ Top portion (liquid crystal side) of sub-pedestal portion 22 dimensions: octagonal shape stretched like an oval, minor diameter 15 μm, major diameter 24 μm, area 321.5 μm$^2$ Base (substrate side) of sub-pedestal portion 22 dimensions: octagonal shape stretched like an oval, minor diameter 20 μm, major diameter 29 μm, area 511.6 μm$^2$ The diameter of the top portion (liquid crystal side) of the main pedestal portion 21 is preferably from 4 to 20 μm (from 2 to 10 μm on either side from the center) greater than the diameter of the top portion (liquid crystal side) of the main spacer 11. The diameter of the top portion (liquid crystal side) of the sub-pedestal portion 22 is preferably from 0.2 to 10 μm (from 0.1 to 5 μm on either side from the center) smaller than the diameter of the top portion (liquid crystal side) of the sub-spacer 12.

When the alignment film material is applied by an ink-jet method or the like, the larger the ridged/grooved step of the substrate is, the more difficult it is to be coated uniformly. The main pedestal portion 21 and the sub-pedestal portion 22 formed on the TFT substrate 20 side are physical obstacles that cause coating unevenness when the alignment film material is applied to the TFT substrate 20. The white arrows in FIGS. 3 and 5 indicate examples of flow paths of the alignment film material when applied. From the perspective of preventing coating unevenness, the main pedestal portion 21 and the sub-pedestal portion 22 preferably have small areas. In the present example, the main pedestal portion 21, which is fewer in number, is larger than the main spacer 11, and the sub-pedestal portion 22, which is greater in number, is smaller than the sub-spacer 12. This allows an increase in the area of the pedestal portions to be suppressed. Furthermore, neither spacer nor pedestal portion is disposed in the fourth corner portion C4, which is adjacent, by the shortest distance (along the rectangular short side), to the first corner portion C1 where the main spacer 11 with a large associated pedestal portion is disposed. Thus, crowding of the pedestal portions is suppressed, and a flow path for when the alignment film material is applied is ensured.

As described above, in Example 1, the sub-pedestal portion 22 associated with the sub-spacer 12 is designed to be small. Thus, in the case where a recess portion such as the contact hole 27 is provided on the TFT substrate 20 side, a flat region F (see FIG. 6) can be formed largely on the flattening film 29 in the region near the sub-spacer 12. In addition, by not disposing a spacer and a pedestal portion in the fourth corner portion C4 adjacent to the first corner portion C1 where the main spacer 11 is disposed makes it possible to form the flat region F largely on the flattening film 29 in the region near the main spacer 11. As a result, in Example 1, the flat region F can be made larger than what is possible in a known configuration, and thus the alignment film material can be applied uniformly. Thus, the liquid crystal display device of Example 1 can achieve a good display quality without display unevenness.

An example of comparison results of the size of the flat region F in a known configuration and in Example 1 will be described below.

In this comparison, the pixel pitch is 50 μm, the bonding misalignment between the color filter substrate 10 and the TFT substrate 20 is 5 μm, and no contact hole 27 is provided between the sub-pedestal portions 22.

Known configuration: sub-pedestal portion 22 width>sub-spacer 12 width

Sub-spacer 12 width (major diameter)=24 μm

Sub-pedestal portion 22 width (major diameter)=27 μm

Spacing between sub-pedestal portions 22 (flat region F width)=50 μm−27 μm=23 μm Configuration of Example 1: sub-spacer 12 width>sub-pedestal portion 22 width Sub-spacer 12 width (major diameter)=27 μm Sub-pedestal portion 22 width (major diameter)=24 μm Spacing between sub-pedestal portions 22 (flat region F width)=50 μm−24 μm=26 μm Note that even with a configuration in which the contact hole 27 is provided between the sub-pedestal portions 22 with a width of 6 μm, according to the configuration of Example 1, the width of the flat region F can be ensured to be 10 μm as seen by the calculation of the following equation.

(26 μm−6 μm)/2=10 μm

Example 2

Figure 7:
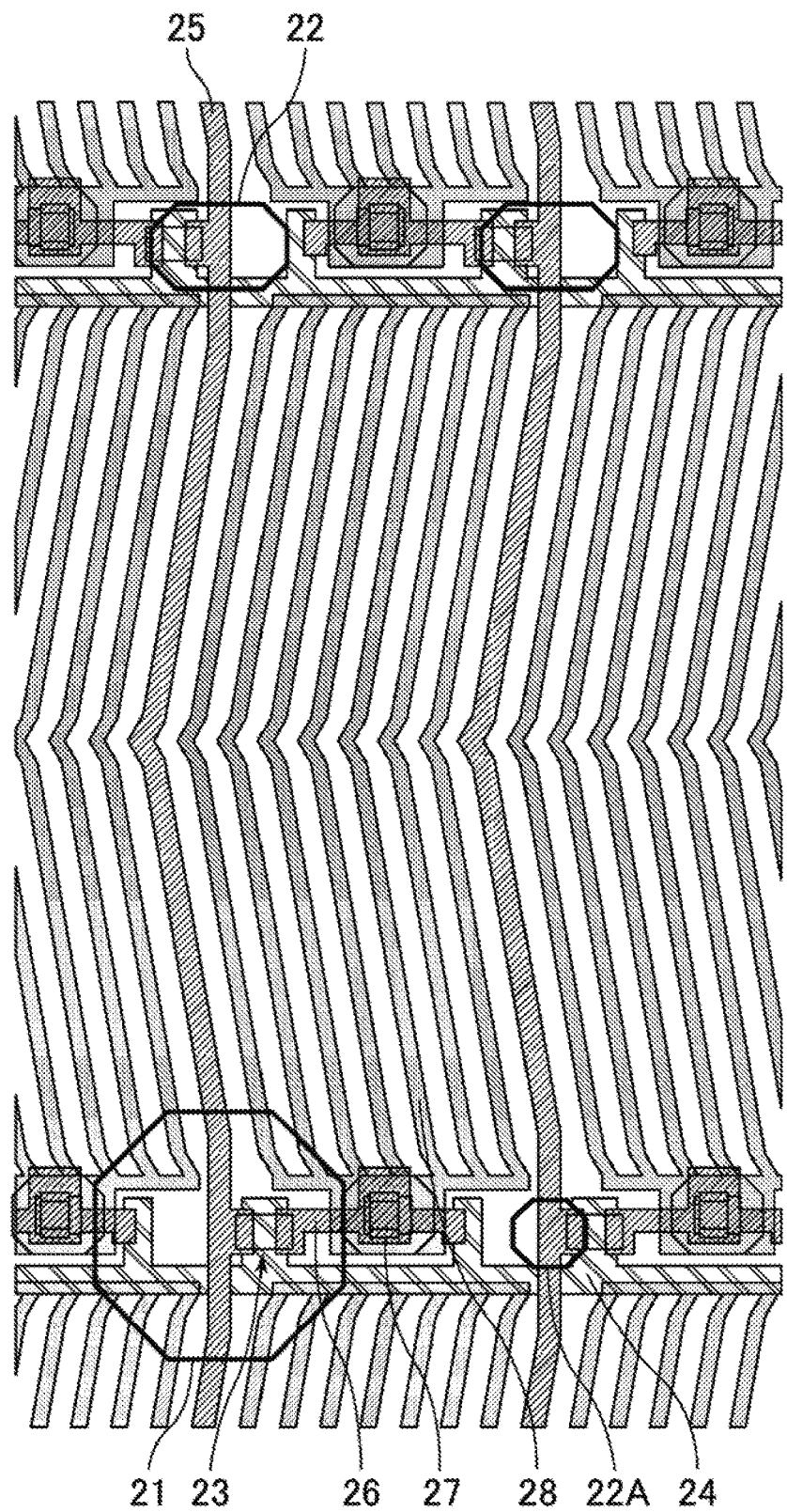
FIG. 7 is a schematic plan view illustrating the configuration of a pixel in a TFT substrate of a liquid crystal display device of Example 2.
Figure 8:
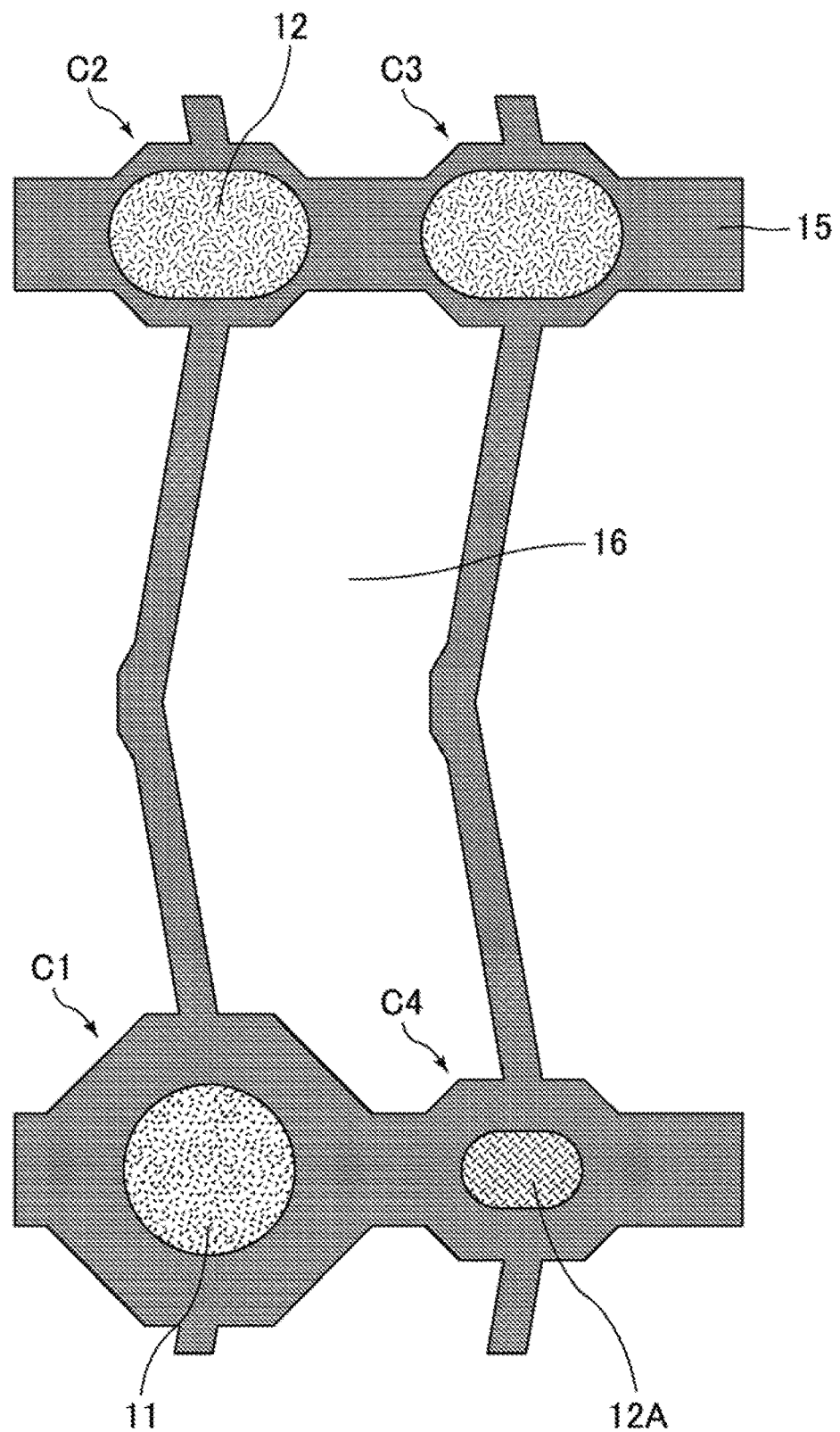
FIG. 8 is a schematic plan view illustrating the configuration of a pixel in a color filter substrate of the liquid crystal display device of Example 2.
Figure 9:
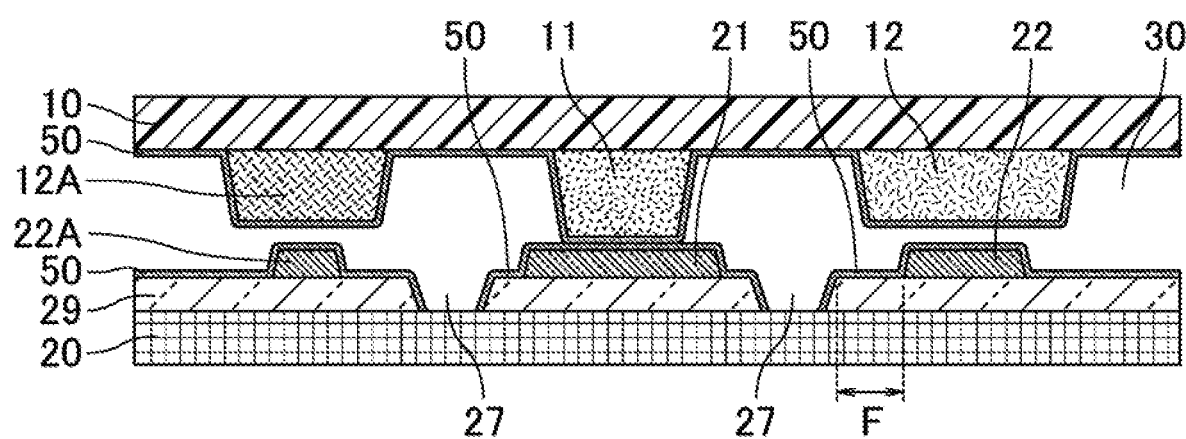
FIG. 9 is an enlarged schematic cross-sectional view illustrating a region near a main spacer and a main pedestal portion in Example 2.
Figure 10:
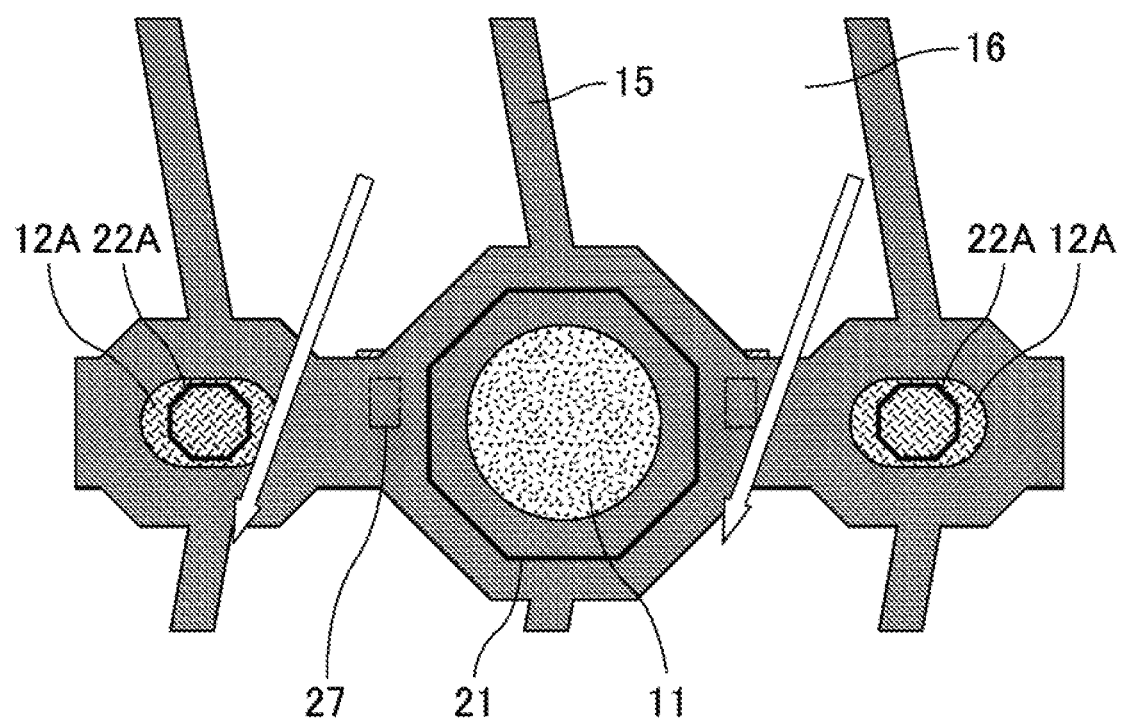
FIG. 10 is an enlarged schematic plan view illustrating a region near the main spacer and the main pedestal portion in Example 2.

FIG. 7 is a schematic plan view illustrating the configuration of a pixel in a TFT substrate of a liquid crystal display device of Example 2. FIG. 8 is a schematic plan view illustrating the configuration of a pixel in a color filter substrate of the liquid crystal display device of Example 2. FIG. 9 is an enlarged schematic cross-sectional view illustrating a region near the main spacer and the main pedestal portion in Example 2. FIG. 10 is an enlarged schematic plan view illustrating a region near the main spacer and the main pedestal portion in Example 2. The liquid crystal display device according to Example 2 will now be described with reference of FIGS. 7 to 10.

The liquid crystal display device of Example 2 employs a Fringe Field Switching (FFS) liquid crystal mode as in the liquid crystal display device of Example 1. Description of configurations similar to those of the liquid crystal display device of Example 1 will be omitted.

In the liquid crystal display device of Example 2, as illustrated in FIGS. 7 and 8, of the four corner portions of the substantially rectangular pixel, the main spacer 11 and the main pedestal portion 21 are provided in the first corner portion C1, and a sub-spacer 12A and a sub-pedestal portion 22A are provided in the fourth corner portion C4 adjacent to the first corner portion C1 along the rectangular short side. Also, the second corner portion C2 adjacent to the first corner portion C1 along the rectangular long side, and the third corner portion C3 adjacent to the second corner portion C2 along the rectangular short side are provided with the sub-spacer 12 and the sub-pedestal portion 22, as in Example 1. The sub-spacer 12A may have the same area as the sub-spacer 12 or may have a smaller area than the sub-spacer 12. The sub-pedestal portion 22A has a smaller area than the sub-pedestal portion 22. In the present example, the sub-pedestal portion 22A with a smaller area than the sub-pedestal portion 22 disposed at the second corner portion C2 and the third corner portion C3 is disposed in the fourth corner portion C4, which is adjacent, by the shortest distance (along the rectangular short side), to the first corner portion C1 where the main spacer 11 with a large associated pedestal portion is disposed. Thus, a flow path for when the alignment film material is applied is ensured.

As described above, in Example 2, the sub-pedestal portion 22 associated with the sub-spacer 12 is designed to be small. Thus, in the case where a recess portion such as the contact hole 27 is provided on the TFT substrate 20 side, the flat region F can be formed largely on the flattening film 29 in the region near the sub-spacer 12. In addition, by disposing the sub-pedestal portion 22A with a smaller area than the sub-pedestal portion 22 in the fourth corner portion C4 adjacent to the first corner portion C1 where the main spacer 11 is disposed makes it possible to form the flat region F relatively largely on the flattening film 29 in the region near the main spacer 11. As a result, in Example 2, the flat region F can be made larger than what is possible in a known configuration, and thus the alignment film material can be applied uniformly.

Figure 11A:
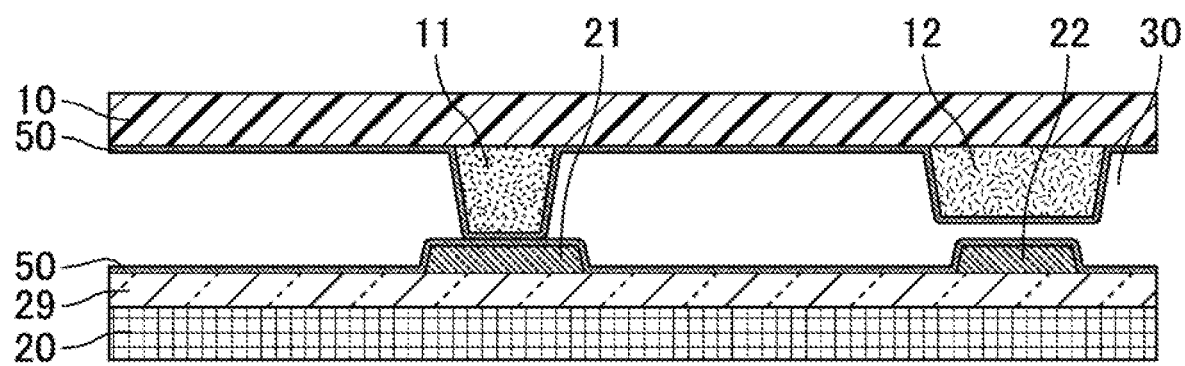
FIG. 11A is a diagram for describing the cross-sectional configuration of the liquid crystal display device of Example 1.
Figure 11B:
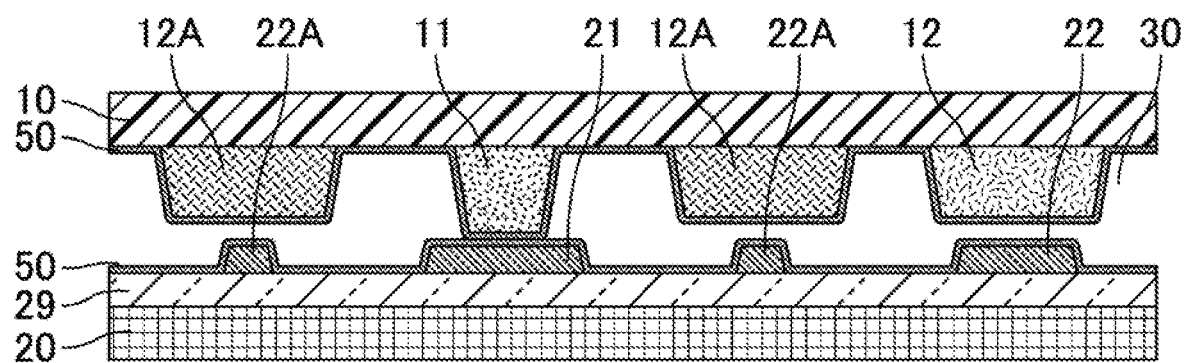
FIG. 11B is a diagram for describing the cross-sectional configuration of the liquid crystal display device of Example 2.
Figure 12:
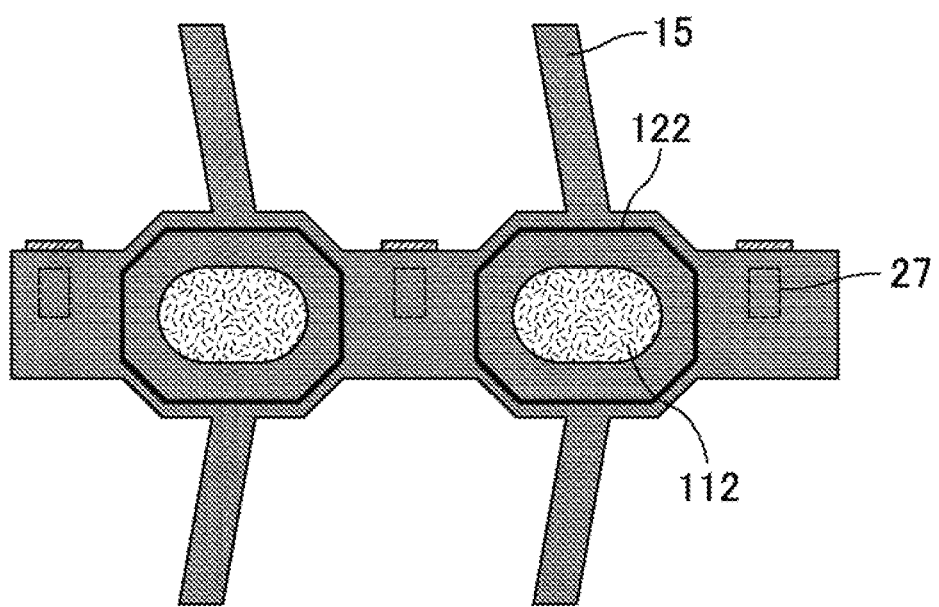
FIG. 12 is a schematic plan view illustrating the arrangement relationship between a sub-spacer and a pedestal portion in a known liquid crystal panel.
Figure 13:
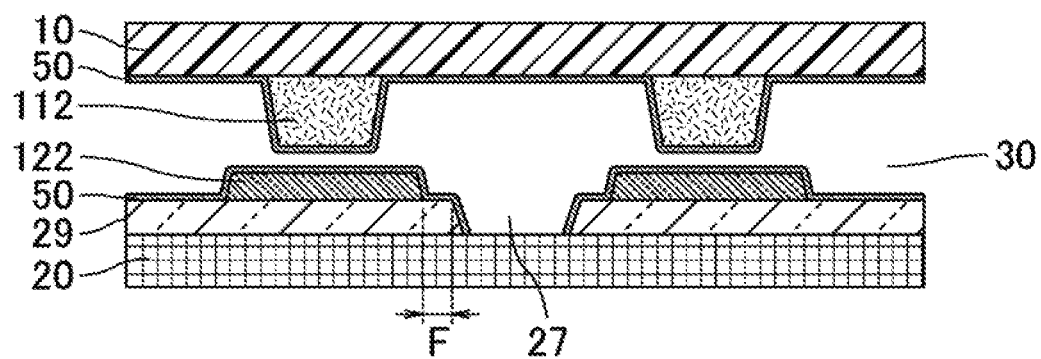
FIG. 13 is a schematic cross-sectional view illustrating the arrangement relationship between a sub-spacer and a pedestal portion in a known liquid crystal panel.

FIGS. 11A and 11B illustrate a comparison between the cross-sectional configuration of the liquid crystal display device of Example 1 (see FIG. 11A) and the cross-sectional configuration of the liquid crystal display device of Example 2 (see FIG. 11B). The design of Example 2 succeeds in ensuring at least a certain level of applicability of the alignment film material while having higher load-resistant properties than Example 1. According to Example 2, there is more freedom in spacer design, and the alignment film material can be applied uniformly. Thus, the effects on other performances of the liquid crystal display device can be kept to a minimum, and a good display quality without display unevenness can be achieved.

Note that design-wise, in a case such as where the main spacer 11 is disposed to the left or right of a pixel boundary with misalignment, the sub-pedestal portion 22 or the sub-pedestal portion 22A may not be formed only at the pixel having the closest distance to the main spacer 11 either on the left or right.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A liquid crystal display device, comprising:
a first substrate;
a second substrate; and
a liquid crystal layer supported between the first substrate and the second substrate,
wherein the first substrate includes a main spacer and a sub-spacer protruding toward the liquid crystal layer,
a height of the main spacer is greater than a height of the sub-spacer,
the second substrate includes, on a surface facing the liquid crystal layer, an alignment film, a main pedestal portion that comes into contact with the main spacer, and a sub-pedestal portion opposite the sub-spacer,
an area of a top portion of the main pedestal portion is greater than an area of a top portion of the main spacer,
an area of a top portion of the sub-pedestal portion is less than an area of a top portion of the sub-spacer, and
an area of a base of the sub-pedestal portion is less than an area of a base of the main pedestal portion.

2. The liquid crystal display device according to claim 1, wherein arrangement density of the sub-pedestal portion is higher than arrangement density of the main pedestal portion.

3. The liquid crystal display device according to claim 1, wherein the second substrate is an active matrix substrate including a contact hole,
the sub-pedestal portion includes a first sub-pedestal portion and a second sub-pedestal portion disposed at a corner portion adjacent to a corner portion where the first sub-pedestal portion is disposed, and
the contact hole is disposed between the first sub-pedestal portion and the second sub-pedestal portion.

4. The liquid crystal display device according to claim 1, wherein the second substrate is an active matrix substrate including a plurality of signal lines disposed intersecting one another in a substrate plane, and
the main pedestal portion and the sub-pedestal portion are disposed at a portion where the plurality of signal lines intersect.

5. The liquid crystal display device according to claim 1, wherein the sub-spacer and the sub-pedestal portion are not disposed at at least one corner portion of corner portions adjacent to a corner portion where the main spacer and the main pedestal portion are disposed.

6. A liquid crystal display device, comprising:
a first substrate;
a second substrate; and
a liquid crystal layer supported between the first substrate and the second substrate,
wherein the first substrate includes a main spacer and a sub-spacer protruding toward the liquid crystal layer,
a height of the main spacer is greater than a height of the sub-spacer,
the second substrate includes, on a surface facing the liquid crystal layer, an alignment film, a main pedestal portion that comes into contact with the main spacer, and a sub-pedestal portion opposite the sub-spacer,
an area of a top portion of the main pedestal portion is greater than an area of a top portion of the main spacer,
an area of a top portion of the sub-pedestal portion is less than an area of a top portion of the sub-spacer,
the sub-pedestal portion includes a third sub-pedestal portion disposed at at least one corner portion of corner portions adjacent to a corner portion where the main spacer and the main pedestal portion are disposed and a first sub-pedestal portion or a second sub-pedestal portion disposed at another corner portion, and
an area of a top portion of the third sub-pedestal portion is less than an area of a top portion of the first sub-pedestal portion or the second sub-pedestal portion.

* * * * *